(12) United States Patent
Coquard et al.

(10) Patent No.: US 11,934,771 B2
(45) Date of Patent: Mar. 19, 2024

(54) STANDARDIZED FORM RECOGNITION METHOD, ASSOCIATED COMPUTER PROGRAM PRODUCT, PROCESSING AND LEARNING SYSTEMS

(71) Applicant: Ivalua SAS, Orsay (FR)

(72) Inventors: Aurélien Coquard, Orsay (FR); Christopher Bourez, Orsay (FR)

(73) Assignee: Ivalua SAS, Massy (FR)

( * ) Notice: Subject to any disclaimer, the term of this patent is extended or adjusted under 35 U.S.C. 154(b) by 819 days.

(21) Appl. No.: 17/018,027

(22) Filed: Sep. 11, 2020

(65) Prior Publication Data
US 2021/0004578 A1 Jan. 7, 2021

Related U.S. Application Data

(63) Continuation of application No. PCT/EP2019/056330, filed on Mar. 13, 2019.

(30) Foreign Application Priority Data

Mar. 13, 2018 (EP) ..................................... 18305268

(51) Int. Cl.
*G06F 40/174* (2020.01)
*G06F 16/25* (2019.01)
*G06F 18/2413* (2023.01)
*G06N 3/04* (2023.01)
(Continued)

(52) U.S. Cl.
CPC .......... *G06F 40/174* (2020.01); *G06F 16/258* (2019.01); *G06F 18/2413* (2023.01);
(Continued)

(58) Field of Classification Search
CPC ...... G06V 40/10; G06V 30/412; G06N 3/045; G06F 16/0032; G06T 17/20; H04N 1/4115
See application file for complete search history.

(56) References Cited

U.S. PATENT DOCUMENTS 5,631,984 A * 5/1997 Graf ..................... H04N 1/4115
382/317
6,044,375 A 3/2000 Shmueli et al.
(Continued)

OTHER PUBLICATIONS

"Yves Rangoni et al: ""Labelling logical structures of documentimages using a dynamic perceptive neural network"",International Journal of Document Analysis Andrecognition (IJDAR), Springer, Berlin, DE,vol. 15, No. 1,Mar. 3, 2011 (Mar. 3, 2011), pp. 45-55, XP035017025, ISSN: 1433-2825, DOI: 10.1007/S10032-011-0151-Y".

(Continued)

*Primary Examiner* — Yosef Kassa
(74) *Attorney, Agent, or Firm* — EIP US LLP

(57) ABSTRACT

The present invention concerns a method for transforming an unstructured set of data representing a standardized form to a structured set of data. The method comprises a processing phase comprising the steps of determining a plurality of data blocks in the unstructured set of data using learning parameters determined using a plurality of samples, each data block corresponding to a visual pattern on the standardized form and being categorized to a known class, of processing data in each data block and of forming a structured set of data using the processed data from each data block, according to the class of this block.

15 Claims, 5 Drawing Sheets

(51) Int. Cl.
*G06N 3/08* (2023.01)
*G06Q 10/10* (2023.01)
*G06Q 40/12* (2023.01)
*G06V 10/764* (2022.01)
*G06V 10/82* (2022.01)
*G06V 30/18* (2022.01)
*G06V 30/412* (2022.01)
*G06V 30/10* (2022.01)

(52) U.S. Cl.
CPC .................. *G06N 3/04* (2013.01); *G06N 3/08* (2013.01); *G06Q 10/10* (2013.01); *G06Q 40/12* (2013.12); *G06V 10/764* (2022.01); *G06V 10/82* (2022.01); *G06V 30/18057* (2022.01); *G06V 30/412* (2022.01); *G06V 30/10* (2022.01)

(56) References Cited

U.S. PATENT DOCUMENTS

| | | | | |
|---|---|---|---|---|
| 7,308,134 | B2* | 12/2007 | Wersing | G06V 10/454 700/47 |
| 9,846,836 | B2* | 12/2017 | Gao | G06N 3/045 |
| 9,943,225 | B1* | 4/2018 | Chakravorty | A61B 5/7275 |
| 10,268,883 | B2* | 4/2019 | Sarkar | G06V 30/412 |
| 10,296,846 | B2* | 5/2019 | Csurka | G06N 3/045 |
| 10,936,820 | B2* | 3/2021 | Schäfer | G06F 40/295 |
| 11,455,525 | B2* | 9/2022 | Yu | G06N 3/045 |
| 2003/0130992 | A1 | 7/2003 | Tyan et al. | |
| 2017/0147540 | A1 | 5/2017 | McCormick et al. | |

OTHER PUBLICATIONS

Gori M et al: ""Artificial Neural Networks for Document Analysis and Recognition"",IEEE Transactions on Pattern Analysis and Machine Intelligence, IEEE Computer Society, USA,vol. 27, No. 1,Jan. 1, 2005 (Jan. 1, 2005), pp. 23-35,XP011122153.

"Abdel Belaid et al: "Structure Extractionin Printed Documents Using NeuralApproaches"",Jan. 1, 2008 (Jan. 1, 2008), pp. 1-23,XP55508326.

International Search Report dated May 9, 2019 for PCT Application No. PCT/EP2019/056330.

European Examination Report dated Nov. 9, 2021 for European Application No. 18305268.7.

* cited by examiner

Invoice

*Company Name*

| | |
|---|---|
| Invoice Number 2 | 000001 |
| Invoice Date | 12/03/2015 |
| Bill to number | 00000001 |
| Client Number | 0000001 |
| Your reference | 3000001 |
| Our reference | 3001 |

Company Name
Street
Town
Country

Page 1/1

Your company name
Street
Town
Country

| Description | Prices | Taxes | Total |
|---|---|---|---|
| - Product 1<br>- Product 2<br>- Service 1 | | | |
| Invoice Total | 500 € | 20 € | 520 € |

Taxable Amount 500 €
Taxes 20 €
Amount due 520 €

Payment terms : NET 30 days

IBAN
0001 0001 0001 0001
BANK Name

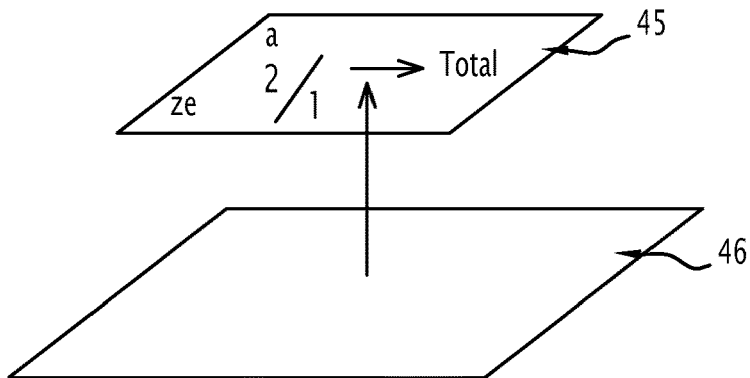
FIG.4
Invoice Number: 0001
Your reference: 0001
Our reference: 0002
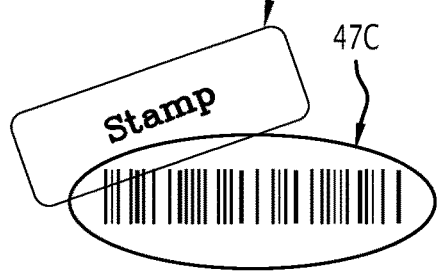
Page: 001/001
| Items | Quantity | Prices | Tax rate | Tax | Amounts |
|---|---|---|---|---|---|
| Product | 1 | 454,58 | 19,60 | 89,47 | 545,97 |
|  | 1 | 2,80 | 19,60 | 0,53 | 3,35 |
|  | 1 | 454,30 |  | 90,02 | 549,32 |
| Service | 1 | 349,43 | 19,60 | 68,49 | 417,92 |
|  | 1 | 2,80 | 19,60 | 0,55 | 3,35 |
|  | 1 | 353,23 |  | 69,04 | 421,27 |
|  |  | 811,53 |  | 159,09 | 470,59 |
|  | Total |  |  |  | 470,59 |
FIG.5

STANDARDIZED FORM RECOGNITION METHOD, ASSOCIATED COMPUTER PROGRAM PRODUCT, PROCESSING AND LEARNING SYSTEMS

CROSS-REFERENCE TO RELATED APPLICATIONS

This application is a continuation of International Application No. PCT/EP2019/056330, filed Mar. 13, 2019, which claims priority to EP Application No. 18305268.7, filed Mar. 13, 2018, under 35 U.S.C. § 119(a). Each of the above-referenced patent applications is incorporated by reference in its entirety.

BACKGROUND OF THE INVENTION

Field of the Invention

The present invention concerns a standardized form recognition method. Particularly, it concerns a method for transforming an unstructured set of data representing a standardized form to a structured set of data.

The present invention concerns also a computer program product, a processing system and a learning system, associated to this method.

Description of the Related Technology

In the meaning of the invention, an unstructured set of data is understood as computer data which can be visualized by a user for example on a screen of an electronic device or printed from it, but cannot be read and processed directly by such an electronic device. An example of an unstructured set of data is an image file of JPG type or a PDF file.

Moreover, in the meaning of the invention, a standardized form is understood as a document having at least some parts which are filled according to some predetermined or standardized formats and eventually, some graphic elements. Thus, a supplier invoice, an administrative form, a curriculum vitae and a specific type of contract are some examples of such a standardized form.

In this context, an unstructured set of data representing a standardized form corresponds for example to an image representing a scanned version of a supplier invoice.

Finally, in the meaning of the invention, a structured set of data associated to a standardized form, corresponds to an electronic version of this form. Data contained in a structured set is readable and usable directly by a computer system. A structured set of data presents for example a computer file of cXML, xCBL, CSV or XML type.

FIG. 1 illustrates an example of a standardized form which is a supplier invoice in this example.

Thus, as it is known in the art and as it is illustrated on this figure, a supplier invoice comprises a title 1, supplier identification (such as supplier's name 2, address 3, bank coordinates 4), recipient or client identification 5 (such as client's name and address), service and product fields 6 presenting items of the invoice, payable amounts 7 (such as prices, taxes, total amount), payment terms 8 and other useful information 9. These types of data are usually common for all invoices. Some additional data may be presented in the invoice and may depend on the supplier.

Upon receipt of an invoice for example in a paper or scanned version, i.e. in a form of an unstructured set of data, a user has to enter all data contained in this invoice, into a computer system in order to generate the corresponding payment order.

Thus, according to a known process of manual invoice filling, upon receipt of the invoice illustrated for example on FIG. 1, the user has to create firstly an invoice form in the corresponding computer system. Then, the user has to fill the fields of this form corresponding to the supplier's name and the invoice number and date. In the example of FIG. 1, this data is situated in the left upper corner of the invoice.

Then, the user has to fill the invoice total amount and the tax amount or the applicable tax rate. In the example of FIG. 1, this data is referenced by reference "7".

If more than one tax rate are applicable, the user can create multiple tax lines and enter manually the amount that corresponds to each tax rate.

Then, if necessary, the user has to enter all of the items mentioned in the "Description" field as well as the corresponding amounts. Particularly, in the example of FIG. 1, the items "Product 1", "Product 2" and "Service 1" referenced by reference "6" have to be entered into the corresponding fields of the invoice form.

Then, if the supplier is not yet registered in the corresponding computer system, the user has to enter its bank coordinates which are referenced by reference "4" in the example of FIG. 1.

Finally, the user has to check all of the fields and if the filling is correct and no modification is needed, proceed to generation of a payment order.

The complexity of this process can vary according to computer system's interface used by the user to enter the data but one can conceive that it presents always a relatively long and laborious process. The task may be even more complex for other types of standardized forms.

Thus, numerous methods in the art propose already at least semi-automatic processing of the unstructured sets of data representing standardized forms.

The most common method consists in using of optical character recognition routines, known as OCR routines.

The OCR routines make it possible to recognize the characters in an image or PDF file so as these characters can be captured and inserted manually into the corresponding fields of the computer system.

Some methods in the art propose further to analyze the captured characters in order to compose words, phrases or linked numbers and to fill automatically the corresponding fields. In this case, usually, the user has to validate the filled data.

Some more sophisticated methods propose to compare the analyzed characters with data bases containing verified information. Such data bases are relative for example to each supplier.

However, the existing methods are not completely satisfying.

In particular, using the OCR routines and basic automatically filling methods does not simplify considerably the user's task of manual control. Using some advanced methods providing for example a database for each supplier, implies creation of such data bases which could be also a long and laborious process. Moreover, the supplier's data can change regularly or a new supplier can appear so as regular updating of the corresponding databases is usually needed.

SUMMARY

The present invention aims to resolve these issues and to propose an efficient method for transforming an unstructured set of data representing a standardized form to a structured set of data, which does not depend on the issuing part. In other words, the present invention aims to propose a method for capturing data from an unstructured set of data.

For this purpose, the present invention proposes a method for transforming an unstructured set of data representing a standardized form to a structured set of data; the method comprising a processing phase; the processing phase comprising the following steps: determining a plurality of data blocks in the unstructured set of data using learning parameters determined using a plurality of samples, each data block corresponding to a visual pattern on the standardized form and being categorized to a known class; processing data in each data block; and forming a structured set of data using the processed data from each data block, according to the class of this block.

In other embodiments, the method may comprise one or several of the following optional features, taken individually or in any technically feasible combination:

- wherein the step of processing data from each data block comprises a sub-step of optical recognition of characters comprised in this block;
- the step of determining a plurality of data blocks in the unstructured set of data comprises the following sub-steps:
    - forming an input layer using the unstructured set of data;
    - propagating the input layer through at least one hidden layer;
    - forming an output layer using data obtained after propagation through the last hidden layer, the output layer being composed with a plurality of data blocks;
    - each layer comprising a plurality of neurons processing at least some items of the corresponding data;
    - at least some neurons of each layer being connected to at least some neurons of its neighboring layer(s) by a propagation function depending on a plurality of weights;
    - the weight being defined by the learning parameters;
- the sub-step of propagating the input layer comprises propagating the input layer through at least two hidden consecutive convolutional layers;
- the sub-step of propagating the input layer comprises propagating the input layer through at least three consecutive groups of hidden layers, called respectively early layers group, middle layers group and last layers group;
    - the neurons of the layers of the early layers group being configured to detect characters, lines and textures;
    - the neurons of the layers of the middle layers group being configured to detect groups of visual attributes and higher level semantics; the neurons of the layers of the last layers group being configured to detect segmentations and to link elements detected by the neurons of layers of the early layers group or of the middle layers group;
- each sample corresponds to an annotated standardized form in which each visual pattern is annotated as a data block, called annotated data block, and is categorized to a known class;
- it further comprising a learning phase comprising the following steps:
    - processing the plurality of samples;
    - generating the learning parameters using the samples;
- the step of processing the plurality of samples comprises the following sub-steps, implemented for each sample:
    - forming an input layer using the sample;
    - propagating the input layer through at least one hidden layer;
    - forming an output layer using data obtained after propagation through the last hidden layer, the output layer being composed with a plurality of test data blocks;
    - each layer comprising a plurality of neurons processing at least some items of the corresponding data;
    - at least some neurons of each layer being connected to at least some neurons of its neighboring layer(s) by a propagation function depending on a current set of weights.
- the step of processing a plurality of samples comprises further the following sub steps, implemented for each sample:
    - determining a cost function representing differences between the test data blocks and the corresponding annotated data blocks;
    - determining a new set of weights by optimizing the cost function;
- the unstructured set of data corresponds to an image or PDF file;
- the standardized form is an invoice document;
- each class of data block is chosen from the group comprising: title, supplier identification, supplier logo, client identification, bank coordinates, items, invoice data, total without taxes, taxes, total with taxes, tax rate, remaining, payment terms, period, stamp, currency, barcode, useful information;
- each data block comprises linked data items.

The invention also relates to a computer program product comprising software instructions which, when executed by a processor, implement a method defined above.

The invention also relates to a processing system configured to implement the processing phase of the method defined above.

The invention also relates to a learning system configured to implement the learning phase of the method defined above.

The method defined above can also be considered as a method for transforming an unstructured set of data representing an invoice document to a structured set of data;

the method comprising a processing phase;

the processing phase comprising the following steps:
- determining a plurality of data blocks in the unstructured set of data using learning parameters determined using a plurality of samples and using a machine learning technique, each sample corresponding to an annotated invoice document in which each visual pattern is annotated as a data block, called annotated data block, and is categorized to a known class, each data block corresponding to a visual pattern on the invoice document and being categorized to a known class;
- processing data in each data block;
- forming a structured set of data using the processed data from each data block, according to the class of this block.

BRIEF DESCRIPTION OF THE DRAWINGS

The invention and its advantages will be better understood upon reading the following description, which is given solely by way of non-limiting example and which is made with reference to the appended drawings, in which:

FIG. 1 is a schematic view of an unstructured set of data representing a supplier invoice;

FIGS. 4 to 6 are a schematic views illustrating some of the steps of the method of FIG. 3;

DETAILED DESCRIPTION OF CERTAIN INVENTIVE EMBODIMENTS

First Embodiment of the Invention

Figure 2:
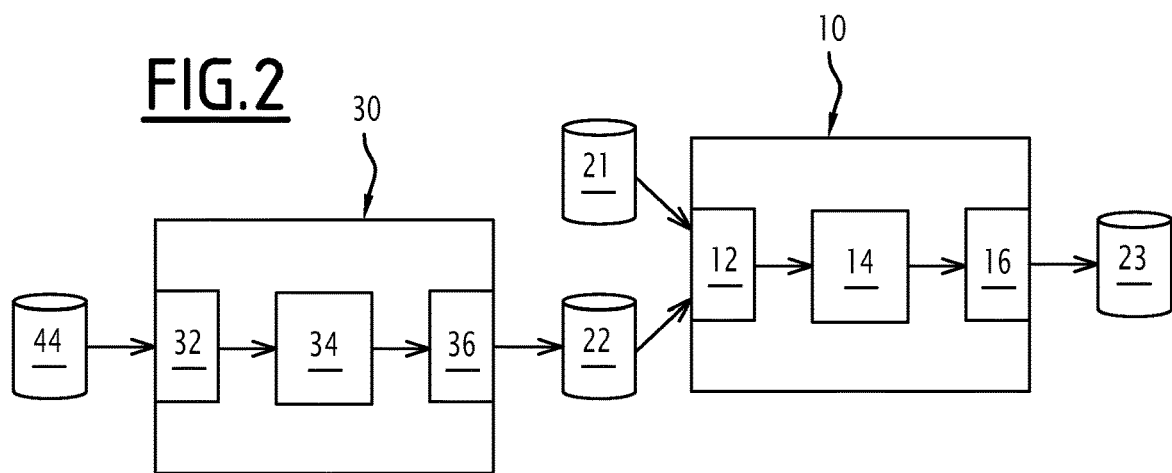
FIG. 2 is a schematic view of a processing system and a learning system, according to a first embodiment of the invention.

The processing system 10 of FIG. 2 is able to transform an unstructured set of data representing a standardized form to a structured set of data, using learning parameters.

Particularly, the processing system 10 is able to implement a processing phase PP of the method according to the first embodiment of the invention, as it will be explained in more detail thereafter.

As it is mentioned above, an unstructured set of data corresponds, for example, to an image or PDF file corresponding notably to a scanned version of the associated standardized form.

A structured set of data associated to a standardized form corresponds, for example, to an XML file comprising readable data by an external computer system.

In reference to FIG. 2, the processing system 10 comprises an input module 12, a computing module 14 and an output module 16.

According to one example of the first embodiment of the invention, the processing system 10 is a computer or a computer cluster comprising a memory able to store software items and at least one processor able to process at least some software items stored in the memory. In this case, the modules 12, 14 and 16 present such software items.

According to another example of the first embodiment of the invention, the processing system 10 presents a more complex computing structure wherein the modules 12, 14 and 16 present at least partially programmable logic devices able to execute at least some computing instructions. An example of such a programmable logic device is an FPGA (Field-programmable gate array).

The input module 12 is able to acquire data issued from a first database 21 and a second database 22.

The computing module 14 is able to process the data acquired by the input module 12.

The output module 16 is able to transmit the data processed by the processing module 14 to a third database 23.

The third database 23 is able to store data issued from the system 10, i.e. structured sets of data representing standardized forms. This database 23 is able notably to transmit the stored data to an external system and according to one example of the first embodiment of the invention, presents a simple buffer connecting the processing system 10 to this external system.

The first database 21 is able to store a plurality of unstructured sets of data, each unstructured set of data representing a standardized form. These sets of data are issued from known data transmission or generating means, as for example supplier mails or emails.

According to one example of the first embodiment of the invention, the first database 21 presents a simple buffer connecting for example an external data transmission system to the processing system 10.

The second database 22 is able to store a plurality of learning parameters generated by a learning system 30 according to the invention.

Particularly, the learning system 30 is able to implement a learning phase LP of the method according to the first embodiment of the invention, as it will be explained in more detail thereafter.

The structure of the learning system 30 is similar to the structure of the processing system 10.

Hence, like in the previous case, the learning system 30 is a computer or a computer cluster comprising an input module 32, a computing module 34 and an output module 35, presenting software items.

According to another example of the first embodiment of the invention, the learning system 30 presents a more complex computing structure wherein the modules 32, 34 and 36 present at least partially programmable logic devices able to execute at least some computing instructions.

The input module 32 is able to acquire data issued from a fourth database 44.

The computing module 34 is able to process the data acquired by the input module 32.

The output module 36 is able to transmit the data processed by the computing module 14 to the second database 22.

The forth database 22 is able to store a plurality of samples, each sample corresponding to an annotated standardized form in which each visual pattern is annotated as a data block and is categorized to a known class.

For example, when the corresponding standardized form presents a supplier invoice, each known class is chosen from the group comprising notably:
- title;
- supplier identification;
- supplier logo;
- client identification;
- bank coordinates;
- items;
- invoice data;
- total without taxes;
- taxes;
- total with taxes;
- tax rate;
- remaining;
- payment terms;
- period;
- stamp;
- currency;
- barcode;
- useful information.

A data block corresponding to an annotated visual pattern will be called hereinafter annotated data block.

In the meaning of the present invention, each visual pattern on a standardized form corresponds to a group of elements on this form that can be visually distinguished from another group of elements.

Thus, for example, each visual pattern comprises for example a specific style of characters, a particular foreground or background color, the presence of delimiting lines (horizontal or vertical) or any other graphical elements.

In the example of FIG. 1, the title 1 and the company name 2 are printed using character styles different from the character style of the other characters of the invoice. So, each one of these items can be associated to an independent visual pattern.

Moreover, in the same example, the client identification 5 is delimited by a box and thus, can be associated to an independent visual pattern. Admitting that the items description box is filled with a specific background color (not visible on the black and white reproduction of FIG. 1), this box can be also associated to an independent visual pattern.

At least some visual patterns may be comprised in one or several other visual patterns.

So, in the example of FIG. 1, each line ("Product 1", "Product 2", "Service 1", "Invoice Total") of the items description box forms a visual pattern comprised in more general visual pattern of the items description box.

At least some visual patterns may contain linked data items. Particularly, by "linked data items", it is understood data items having at least one semantic and/or visual link. A semantic link is a link that can be established using a known rule, as for example a grammar rule, a mathematical rule, a physical rule, a logical rule, etc.

Thus, in the example of FIG. 1, the visual pattern corresponding to the items description box comprises the linked data items "Total", "Invoice Total" and "520€".

Indeed, the data item "520€" is situated in the intersection position of a vertical line passing through the data item "Total" and a horizontal line passing through the data item "Invoice Total". In this case, these data items are linked visually.

In the same example, the visual pattern corresponding to the line "Invoice Total" comprises three linked data items: "500€", "20€" and "520€". Indeed, in this case, the total amount "520€" corresponds to the sum of the prices "500€" and taxes "20€". In this case, these data items are linked semantically by a mathematical rule.

Method

Figure 3:
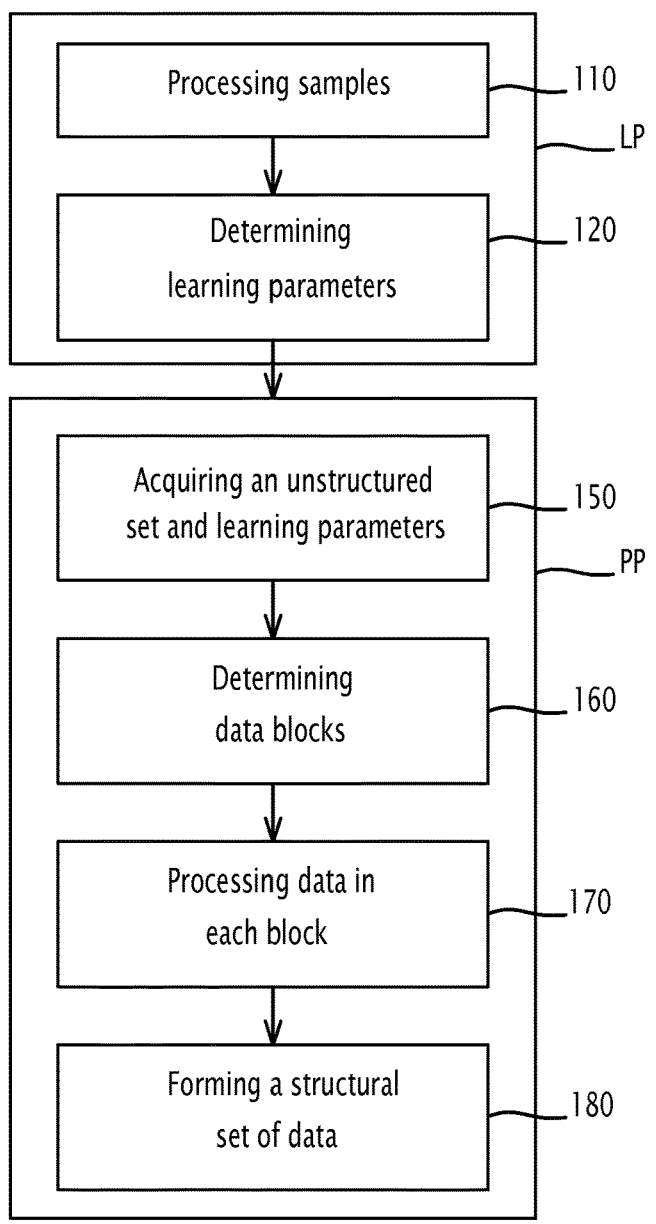
FIG. 3 is a flowchart of a method for transforming an unstructured set of data according to the first embodiment of the invention, the method being implemented by the systems of FIG. 2.

The method for transforming an unstructured set of data representing a standardized form to a structured set of data, according to the first embodiment of the invention will now be explained in view of FIG. 3 presenting a flowchart of its steps.

As mentioned before, the method comprises a processing phase PP implemented by the processing system 10 and a learning phase LP implemented by the learning system 30.

The learning phase LP is executed at least once before executing the processing phase PP. It is understood that the invention is not limited to this particular example. The leaning phase LP and the processing phase PP can be implemented by different systems or a same system, as it will be explained in relation with the further embodiments. In addition, multiple processing phases PP can be implemented after a learning phase LP.

Initially, the second and the third databases 22, 23 are empty. The first database 21 contains at least one unstructured set of data to be transformed to a structured set. The fourth database 44 contains a plurality of samples as defined above. In particular, each sample defines a plurality of annotated data blocks and a class for each data block. For example, such annotation has been performed manually by an operator or a user for the corresponding type of the standardized form, using an annotation tool known in the art.

Such an annotation tool is chosen for example from the group comprising: Faster RCNN, Yolo, SSD, Feature Pyramid Pooling, DeepMask, SharpMask and Mask RCNN.

Particularly, each one of these annotation tools is able to detect visual patterns using one of the known computer vision techniques.

The operator or the user can thus validate or modify the detected visual pattern by the tool.

Moreover, the operator or the user has the possibility to associate to each detected or modified visual pattern a class depending on the type of the corresponding standardized form.

Step 110

During the first step 110 of the learning phase LP, the learning system 30 acquires the samples contained in the fourth database 44.

Then, the learning system 30 processes these samples in order to generate a plurality of learning parameters, using a machine learning technique.

In particular, during this step 110, the learning system 30 processes each sample via a convolutional neural network, known also as CNN.

The CNN used by the learning system 30 contains an input layer, a plurality of hidden layers and an output layer. At least some of the hidden layers are convolutional layers.

As it is known in the art, each one of the layers of such a network comprises a plurality of neurons processing at least some items of the data processed by this layer. Moreover, as it is known in the art, at least some neurons of each layer are connected to at least some neurons of its neighboring layer(s) by a propagation function depending on a plurality of weights.

Each layer presents a size which corresponds to the number of neurons used by the layer. Moreover, each layer presents a dimension which is determined by the arrangement of the neurons in the layer.

Initially the weights are defined for example by random coefficients.

Each neuron in a given layer is defined by an activation function which computes a neuron output from a neuron input which is determined by neuron outputs of the predecessor neurons and by the corresponding propagation functions.

By expression "predecessor neuron" in relation with a given neuron, it is understood a neuron from the layer previous to the layer of the given neuron and connected to this given neuron.

Generally, the same activation function is used for all of the neurons of the same layer.

Different examples of the activation functions can be chosen.

Thus, for example, it is possible to choose an activation function called "ReLU" which signifies "rectified linear unit". This function is defined as positive part of its argument, i.e. of the neuron input. In other words, by denoting this function as $f$, it can be defined using the following expression:

$$f(x)=\max(0,x),$$

where x is the neuron input.

It is also possible to choose a ReLU function extended to include Gaussian noise. Such a function is called "Noisy ReLU" and is determined using the following expression:

$$f(x) = \frac{e^x}{e^x - 1},$$

where Y is a random variable following the Gaussian distribution.

It is also possible to choose an activation function called "sigmoid" corresponding to a sigmoid curve. By denoting this function as $f$, it can be defined using the following expression:

$$f(x) = \frac{e^x}{e^x - 1},$$

where x is the neuron input.

It is also possible to choose an activation function called "softmax" which gives a vector output from several preceding neuron outputs. It can be defined using the following expression:

$$f_j(x) = \frac{e^{x_i}}{\sum_k e^{x_k}}.$$

where:
$f_j$ is a j component of the vector output, and
z is a vector input composed with $z_j$ components corresponding to several neuron outputs from the previous layer.

Of course, many other examples of activation functions are still possible.

Different examples of the hidden layers as well as their dimension, size and activation functions are also possible.

Thus, as indicated below, at the CNN implemented by the learning system 30, at least some of the hidden layers are convolutional layers.

In particular, the activation function of each of the neurons of a convolutional layer presents a convolutional operation depending on the outputs of a group of neurons of the previous layer which is called "receptive field".

So, using of the convolutional layers reduces the number of the weights used by the corresponding propagation functions.

The CNN implemented by the learning system 30 may also comprise some other types of hidden layers, as for example a pooling layer.

In particular, each neuron of a pooling layer combines the outputs of a group of neurons of the previous layer. Such a neuron computes its activation function as function of these outputs.

For example, each of the neurons of a pooling layer called "max pooling" computes its activation function as the maximum value from the outputs of the associated group. Each of the neurons of a pooling layer called "average pooling" computes its activation function as the average value from the outputs of the associated group.

According to a particular example of the first embodiment of the invention, the CNN constructed by the learning system 30 comprises at least four hidden layers. Among these layers, three layers are convolutional two-dimensional layers using the ReLU function as activation function and one layer is a max pooling layer.

Such a CNN can be constructed using for example Keras library for Python.

Returning to the description of the step 110 in more detail, during this step, the learning system 30 implements a backpropagation technique via the constructed CNN for the samples contained in the fourth database 44.

The implementation of this technique applies execution of the following five sub steps, implemented consecutively for each sample.

In particular, during a first sub-step, the learning system 30 forms an input layer using the corresponding sample.

During a second sub-step, the learning system 30 propagates the input layer through the hidden layers using notably the corresponding propagation functions and the current set of weights.

During a third sub-step, the learning system 30 forms an output layer so as it is composed with a plurality of data blocks which are considered by the CNN to correspond to the visual patterns of the corresponding sample. These data blocks are called hereinafter test data blocks.

During a forth sub-step, the learning system 30 determines a cost function representing differences between the test data blocks and the annotated data blocks on the corresponding sample. The differences concern for example distances, dimensions, forms, block classes, and other features of the corresponding blocks.

Such a cost function is determined using an appropriate metric known in the art.

During a fifth sub-step, the learning system 30 determines a new set of weights using the cost function and an optimization technique, known in the art. This technique could consist for example in minimization of the cost function.

Optionally, for at least one the samples, the step 110 further comprises a sixth sub-step wherein the learning system 30 introduces random variations or noises to the corresponding sample.

Then, the learning system 30 executes once again the previous sub-steps for the modified sample.

In an alternative embodiment, the fourth database 44 comprises already one or several samples corresponding to different variations of another sample comprised in this database 44.

According to one example of the first embodiment of the invention, the step 110 comprises a preliminary sub-step executed for at least one sample. During this preliminary sub-step, the corresponding sample is pre-processed before its processing by the CNN. For example, such pre-processing may comprise applying of a known dimension reduction technique.

After executing these sub-steps for all of the samples contained in the fourth database 44, the learning system executes the step 120 consisting in determining a plurality of learning parameters.

Step 120

In particular, during this step 120, the learning system 30 defines these learning parameters by the current set of weights.

At the end of the step, the learning system 30 stores the learning parameters in the second database 22 eventually with the CNN's structure using one or several appropriate frameworks.

Such a framework corresponds for example to one of the known frameworks used by the following machine learning libraries or tools: Labelme, CNTK FasterRCNN/VoTT and Detectron/Caffe2.

At the end of the learning phase LP, the CNN with the learning parameters present a structure which is configured to detect data blocks corresponding to visual patterns on a standardized form.

In particular, the hidden layers of such a structure can be regrouped into three consecutive groups of layers called respectively early layers group, middle layers group and last layers group.

The neurons of the early layers group are configured to detect characters, lines and textures in the data processed by the layers of this group.

This configuration is illustrated on FIG. 4 wherein the characters "z", "e", "a", "2", "1", "T", "o", "t", "a", "I" as well as a line and an arrow, have been detected by a layer 45 of the early layers group, from the input layer 46.

The neurons of the middle layers group are configured to detect groups of visual attributes and higher level semantics in the data processed by the layers of this group.

For example, the visual attributes comprise logos, barcodes, stamps or other graphical illustrations.

The higher level semantics comprise words, numerics, dates, expressions, etc.

In the example illustrated on FIG. 5, the layers of the middle layers group are able to detect for example the logo 47A, the stamp 47B, the barcode 47C, the word "total" 48A, the word "amounts" 48C and the number "970,59".

The neurons of the last layers group are configured to detect segmentations and to link at least some data blocks detected previously one to another so as to form a new data block or to categorize at least one of these blocks.

Thus, in the example of FIG. 5, the layers of the last layers group are for example able to detect the segmentations 49A and 49B corresponding respectively to "products" and "services".

Further, in the example of the same figure, the layers of the last layers group are for example able to link the data blocks 48A, 48B and 48C one to another so as to categorize the data block 48B. Indeed, it clear that the number 48B placed in the intersection position of a horizontal line passing through the data block "total" 48A and a vertical line passing through the data block 48C, corresponds to the total amount of the invoice illustrated on this figure.

Step 150

During the first step 150 of the processing phase PP, the processing system 10 acquires an unstructured set of data to be transformed from the first database 21 as well as the learning parameters and eventually the CNN's structure from the second database 22.

Step 160

During the next step 160, the processing system 10 determines a plurality of data blocks in the unstructured set of data using the learning parameters. Each data block corresponds to a visual pattern on the corresponding standardized form and is categorized to a known class.

This step 160 is performed using the same CNN used during the learning phase LP with the weights corresponding to the learning parameters.

Consequently, this step 160 comprises several sub-steps which are similar to the first, second and third sub-steps of the step 110 of the learning phases LP detailed before.

Particularly, during a first sub-step of the step 160, the processing system 10 forms an input layer using the unstructured set of data.

During a second sub-step, the processing system 10 propagates the input layer through the hidden layer explained above, using the same propagation functions as well as the weighs issued from the second database 22.

During a third sub-step, the processing system 10 forms an output layer using data obtained after propagation through the last hidden layer. This output layer is composed with a plurality of data blocks, each data block being characterized to a known class.

Figure 6:
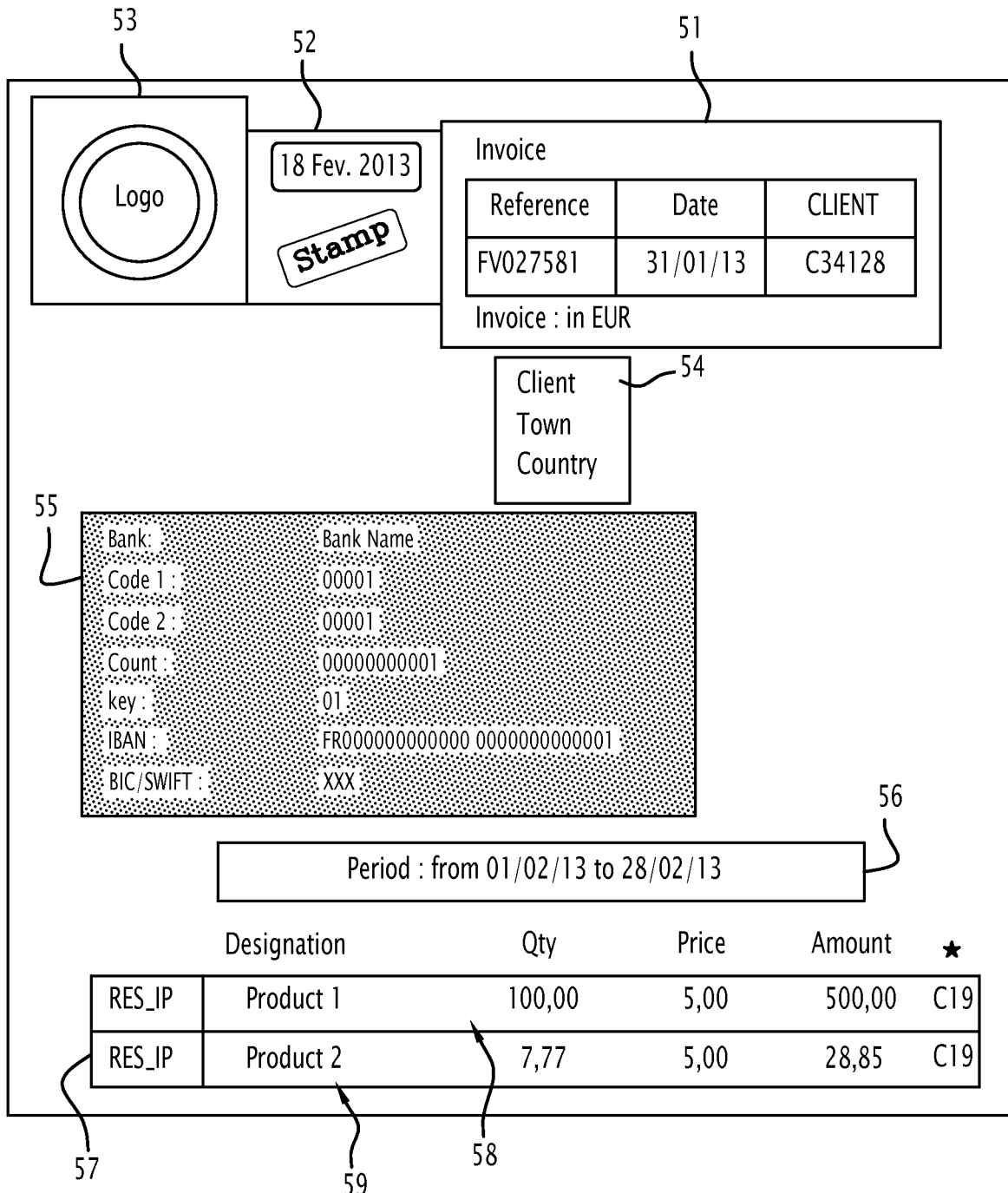

An example of an output layer obtained during the execution of this sub-step for a particular unstructured set of data representing an invoice, is illustrated on FIG. 6.

Thus, in reference to this figure, during this sub-step, the processing system 10 determines blocks 51 to 57 which are categorized respectfully as a title block (block 51), a stamp block (block 52), a supplier logo block (block 53), a client identification block (block 54), a bank coordinates block (block 55), a period block (block 56) and an invoice data block (block 57).

As it can be seen on this figure, each one of these blocks corresponds to a specific visual pattern.

Indeed, the block 51 contains delimiting lines. The block 52 contains some irregular graphical elements which correspond to a date stamp and a processed stamp. The block 53 contains a regular graphical element which corresponds to a suppler logo. The blocks 54 and 55 contain characters regrouped in a specific manner. Additionally, the block 55 may be delimited by a specific background color (not visible on the black and white reproduction of the figure). Similarly, the blocks 56 and 57 contain characters regrouped in a specific manner and delimited by separation lines and boxes.

Moreover, at least some of these blocks contain sub-blocks. Thus, the invoice data block 57 contains a first item block 58 and a second item block 59. Of course, each one of these sub-blocks can contain other sub-blocks related for example to an amount, a total amount, taxes, etc.

Step 170

During the next step 170, the processing system 10 processes data in each data block.

This step is for example performed by capturing data characters in the corresponding data block. In this case, a sub-step of optical recognition of characters comprised in the corresponding data block, is executed.

The step 170 can also be performed without data capturing, using only the information about the corresponding block. Thus, for example, if the block's class corresponds to the class "stamp" or to the class "supplier logo", this data block can be simply ignored.

Step 180

During the next step 180, the processing system 10 forms a structured set of data using the processed data from each data block, according to the class of this block.

Thus, for example, for a data block categorized to the class "supplier identification", the characters captured in this block will be automatically associated to the supplier's name and address in the corresponding field of the structured set of data.

According to one example of the first embodiment of the invention, this step 180 further comprises analyzing the data blocks using an analysis by regular expressions.

In particular, each regular expression presents a generic predetermined rule, also called a pattern.

For example, it is possible to associate to each field of the structured set of data, a regular expression that matches a data block if the data issued from this data block corresponds to this field.

Thus, it is possible to implement an additional test of the class associated to each data blocks.

One can conceive that the invention according to the first embodiment presents a certain number of advantages.

First of all, the invention proposes to recognize visual patterns (or data blocks in the meaning of the invention) in a standardized form and not the characters as it is proposed by the art. Each visual pattern is associated to a known class.

According to the invention, the visual patterns are recognized using a machine learning technique using predetermined learning parameters.

These learning parameters are determined using a plurality of annotated samples and for example a backpropagation technique.

The samples can be annotated manually depending on the type of the considered standardized form.

After recognizing data blocks corresponding to the visual patterns of the standardized form, data contained in each block can be processed using, among others, an optical character recognition routine. Given the information about the block's class, the recognized characters can be more simply associated to the corresponding field in the structured set of data.

For example, for a data block categorized to the class "bank coordinates", a sequence of numeric characters corresponds more likely to the supplier's IBAN than to the supplier's telephone number.

Moreover, an analysis by regular expressions can be applied in order to check the captured data validity. Thus, for example, it is possible to check the number captured as an IBAN by a regular expression corresponding to a generic form of an IBAN number.

Thus, using the invention, there is no need to constitute a separate database for each supplier or more generally, issuing part. A generic database containing the learning parameters for each specific type of standardized form is sufficient to process any standardized form issued even from a new supplier.

Second Embodiment of the Invention

Figure 7:
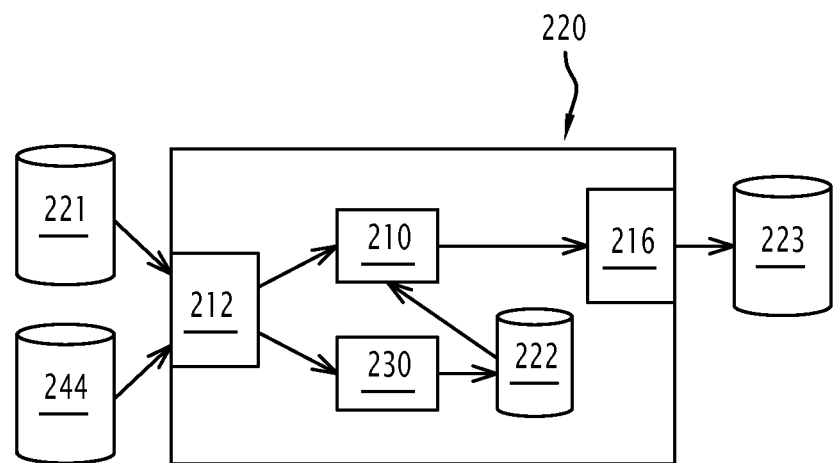
FIG. 7 is a schematic view of a processing system and a learning system, according to a second embodiment of the invention.

FIG. 7 illustrates a processing system 210 and a learning system 230 according to a second embodiment of the invention.

According to the second embodiment of the invention, the processing system 210 and the learning system 230 are integrated into a unique computing structure 220 further comprising an input module 212 and an output module 216.

The unique computing structure 220 is for example a computer or a computer cluster comprising a memory able to store software items and at least one processor able to process at least some software items stored in the memory. In this case, the modules 212 and 216, and the systems 210 and 230 present such software items.

According to another example of the second embodiment of the invention, the unique computing structure 220 presents a more complex computing structure wherein the modules 212 and 216, and the systems 210 and 230 present at least partially programmable logic devices able to execute at least some computing instructions. An example of such a programmable logic device is an FPGA (Field-programmable gate array).

According to the second embodiment of the invention, the input module 212 is able to acquire data issued from a first database 221 similar to the first database 21 explained above and from a fourth database 244 similar to the fourth database 44 explained above.

Figure 8:
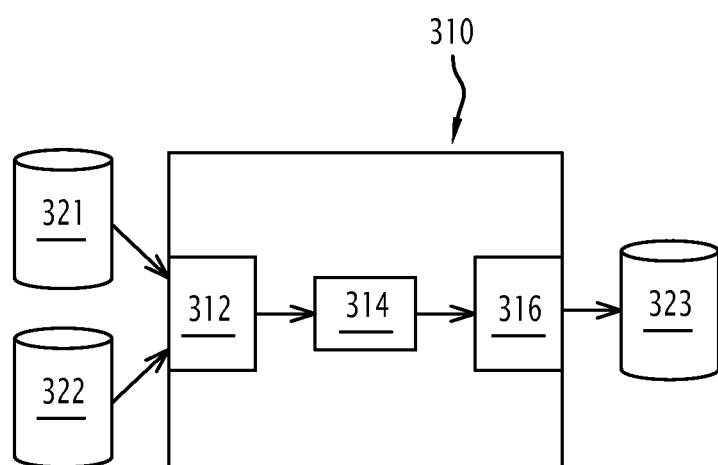
FIG. 8 is a schematic view of a processing system, according to a third embodiment of the invention.

The processing system 210 is able to implement a processing phase PP of the method according to the second embodiment of the invention using data acquired by the input module 212 as well as data issued from a second database 222 which, according to the example illustrated on FIG. 8, is integrated into the unique computing structure 220.

Further, by implementing the processing phase PP, the processing system 210 is able to produce data.

The learning system 230 is able to implement a learning phase LP of the method according to the second embodiment of the invention using data acquired by the input module 212.

Further, by implementing the learning phase LP, the learning system 210 is able to produce data and to store the produced data in the second database 222.

Finally, the output module 216 is able to acquire the data produced by the processing system 210 and to store this data in the third database.

According to a non-illustrated example of the second embodiment of the invention, the second database is an exterior database from the unique computing structure 220. In this case, the input module 212 is further able to acquire data stored in this second database 222 and the output module 216 is further able to store data produced by the learning module 230 in the second database 222. Additionally, in this case, the processing system 210 is able to acquire the data issued from the second database 222 via the input module 212.

The method according to the second embodiment of the invention is similar to the method according to the first embodiment of the invention, and will not be explained in further detail.

The invention according to the second embodiment presents the same advantages as the invention according to the first embodiment.

Third Embodiment of the Invention

FIG. 8 illustrates a processing system 310 according to a third embodiment of the invention.

According to the third embodiment of the invention, the processing system 310 is similar to the processing system 10 according to the first embodiment of the invention.

Particularly, according to the third embodiment of the invention, the processing system comprising an input module 312, a computing module 314 and an output module 316 which are similar respectfully to the modules 12, 14 and 16 explained before.

The input module 312 is able to acquire data issued from a first database 321 and a second database 322.

The computing module 314 is able to process the data acquired by the input module 312.

The output module 316 is able to store the data processed by the computing module 314 in a third database 323.

The first database 321 and the third database 323 are similar respectively to the first database 21 and the third database 23 explained above.

According to the third embodiment of the invention, the second database 322 is able to store learning parameters generated by an external system.

Thus, for example, these parameters are generated by the external using a method similar to the learning phase LP explained before.

The method according to the third embodiment of the invention differs from the method according to the first embodiment of the invention only in that it does not comprise a specific learning phase.

In this case, the learning parameters used during the processing phase PP are issued directly from the second database 322.

Moreover, it is clear that if the processing phase PP of the method according to the third embodiment of the invention uses a CNN, its structure should be similar to the structure of a CNN used by the external system to generate the learning parameters.

The invention according to the third embodiment presents the same advantages as the invention according to the first and the second embodiments.

What is claimed is:

1. Method for transforming an unstructured set of data representing an invoice to a structured set of data;
the method comprising a processing phase;
the processing phase comprising the following steps:
    determining a plurality of data blocks in the unstructured set of data using machine learning parameters determined using visual patterns on the invoice and being categorized to a known class;
    processing data in each data block; and
    forming a structured set of data using the processed data from each data block, according to the class of this block;
    wherein the step of determining a plurality of data blocks in the unstructured set of data comprises the following sub-steps:
    forming an input layer using the unstructured set of data;
    propagating the input layer through at least one hidden layer; and
    forming an output layer using data obtained after propagation through the last hidden layer, the output layer determining a plurality of data blocks;
    each layer comprising a plurality of neurons processing at least some data derived from the unstructured set of data;
    at least some neurons of each layer being connected to at least some neurons of its neighboring layer(s) by a propagation function depending on a plurality of weights;
    the weight being defined by the machine learning parameters.

2. Method according to claim 1, wherein the machine learning parameters were further determined using a convolutional neural network configured to detect segmentations.

3. Method according to claim 1, wherein the step of processing data from each data block comprises a sub-step of optical recognition of characters comprised in this block.

4. Method according to claim 1, wherein the sub-step of propagating the input layer comprises propagating the input layer through at least two hidden consecutive convolutional layers.

5. Method according to claim 1, wherein the sub-step of propagating the input layer comprises propagating the input layer through at least three consecutive groups of hidden layers, called respectively early layers group, middle layers group and last layers group;
    the neurons of the layers of the early layers group being configured to detect characters, lines and textures;
    the neurons of the layers of the middle layers group being configured to detect groups of visual attributes and higher level semantics; and
    the neurons of the layers of the last layers group being configured to detect segmentations and to link elements detected by the neurons of layers of the early layers group or of the middle layers group.

6. Method according to claim 1, wherein the visual patterns on the invoice being recognized using a plurality of samples;
    each sample corresponds to an annotated invoice in which each visual pattern is annotated as a data block, called annotated data block, and is categorized to a known class.

7. Method according to claim 6, further comprising a learning phase comprising the following steps:
    processing the plurality of samples; and
    generating the machine learning parameters using the samples.

8. Method according to claim 7, wherein the step of processing the plurality of samples comprises the following sub-steps, implemented for each sample:
    forming an input layer using the sample;
    propagating the input layer through at least one hidden layer; and
    forming an output layer using data obtained after propagation through the last hidden layer, the output layer being composed with a plurality of test data blocks;
    each layer comprising a plurality of neurons processing at least some items of the corresponding data; and
    at least some neurons of each layer being connected to at least some neurons of its neighboring layer(s) by a propagation function depending on a current set of weights.

9. Method according to claim 8, wherein the step of processing a plurality of samples comprises further the following sub-steps, implemented for each sample:
    determining a cost function representing differences between the test data blocks and the corresponding annotated data blocks; and
    determining a new set of weights by optimizing the cost function.

10. Learning system configured to implement the learning phase of the method according to claim 7.

11. Method according to claim 1, wherein the unstructured set of data corresponds to an image or PDF file.

12. Method according to claim 1, wherein each class of data block is chosen from the group comprising:
    title;
    supplier identification;
    supplier logo;
    client identification;
    bank coordinates;
    items;
    invoice data;
    total without taxes;
    taxes;
    total with taxes;
    tax rate;
    remaining;
    payment terms;
    period;
    stamp;
    currency;
    barcode;
    useful information.

13. Method according to claim 1, wherein each data block comprises linked data items.

14. A computer memory comprising software instructions which, when executed by a processor, implement a method according to claim 1.

15. Processing system configured to implement the processing phase of
    the method according to claim 1.

* * * * *